United States Patent [19]

Brakus

[11] Patent Number: 5,631,816
[45] Date of Patent: May 20, 1997

[54] DC VOLTAGE CONVERTER WITH CURRENT LIMITATION

[75] Inventor: Bogdan Brakus, Stockdorf, Germany

[73] Assignee: Siemens Aktiengesellschaft, Munich, Germany

[21] Appl. No.: 500,589

[22] Filed: Jul. 11, 1995

[30] Foreign Application Priority Data

Jul. 18, 1994 [EP] European Pat. Off. ............ 94111189

[51] Int. Cl.⁶ .......................... H02M 3/24; H02M 5/42; H02M 7/44
[52] U.S. Cl. ........................................ 363/97; 363/56
[58] Field of Search ........................ 363/21, 56, 97, 363/127

[56] References Cited

U.S. PATENT DOCUMENTS

| | | | |
|---|---|---|---|
| 5,285,366 | 2/1994 | Zaretsky | 363/56 |
| 5,408,402 | 4/1995 | Nonnenmacher | 363/97 |
| 5,465,201 | 11/1995 | Cohen | 363/97 |
| 5,469,349 | 11/1995 | Marinus | 363/97 |
| 5,528,483 | 6/1996 | Mohandes | 363/56 |

*Primary Examiner*—Stuart N. Hecker
*Attorney, Agent, or Firm*—Hill, Steadman & Simpson

[57] ABSTRACT

A DC voltage converter provided having an electronic switch that can be switched conductive by turn-on pulses and having an additional electronic switch driven in equiphase fashion with the electronic switch of the main circuit and serves the purpose of peak value rectification. In order to eliminate the injurious influence of component tolerances, a device for pulse processing is provided between the output of the control circuit and the control inputs of the electronic switches. The voltage converter is especially suitable for applications wherein low-impedance shorts at the output of the voltage converter must be taken into consideration.

11 Claims, 7 Drawing Sheets

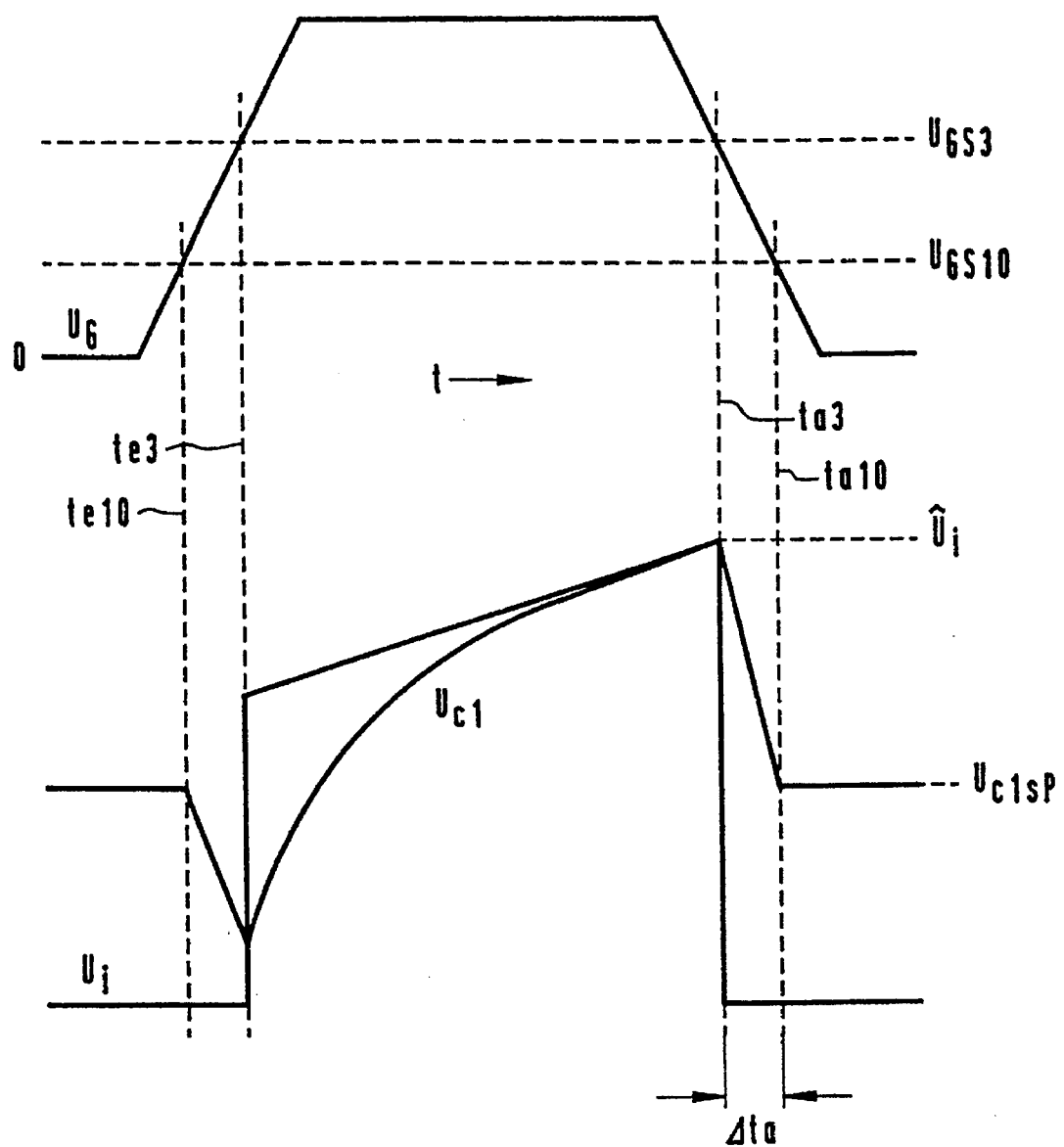

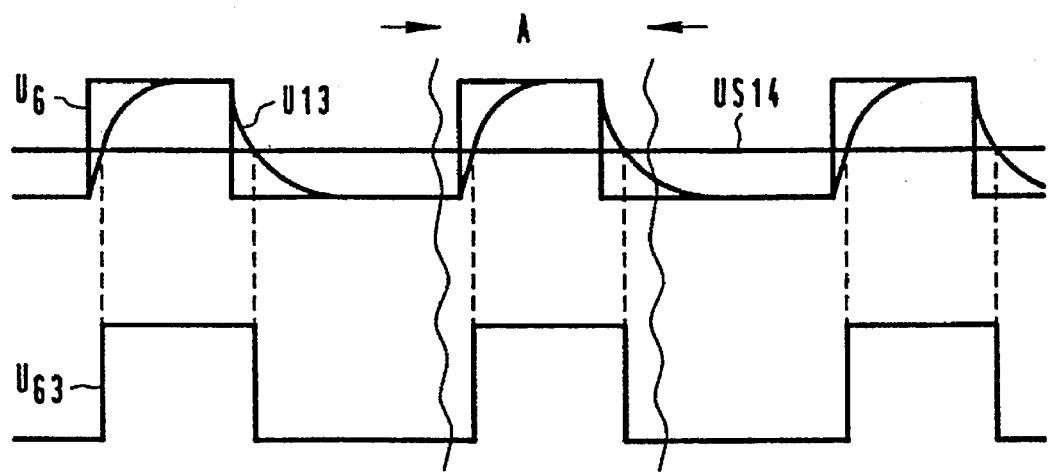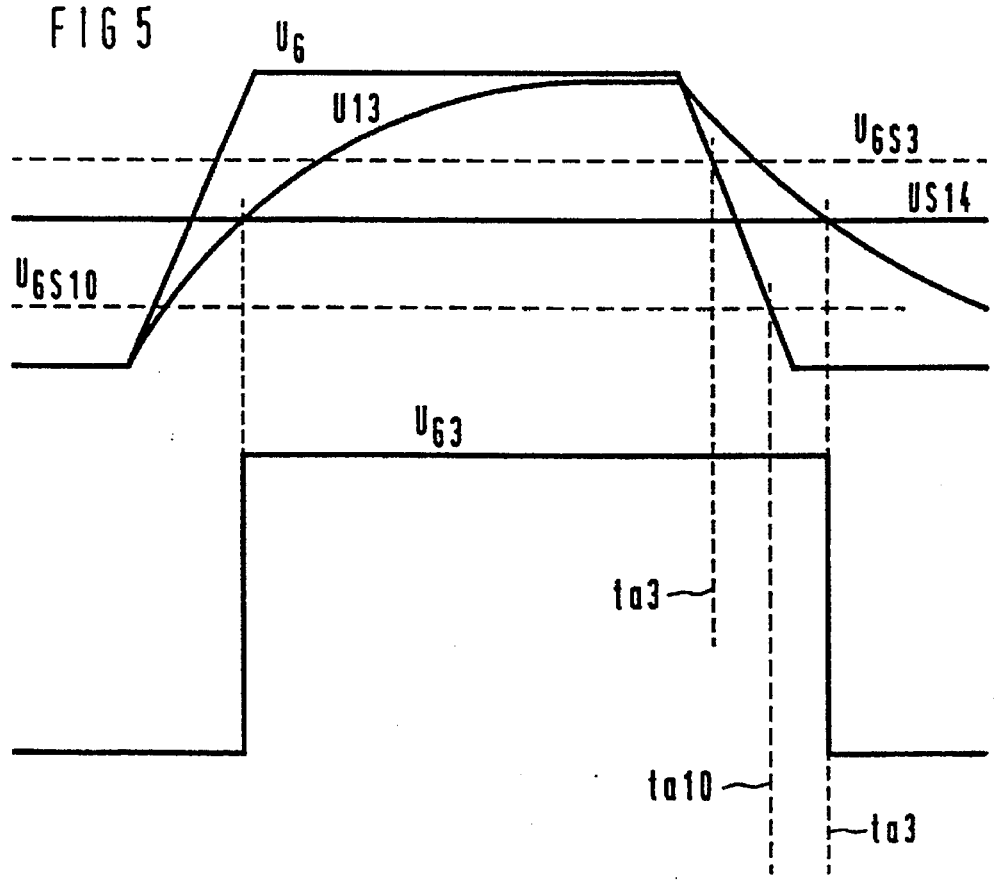

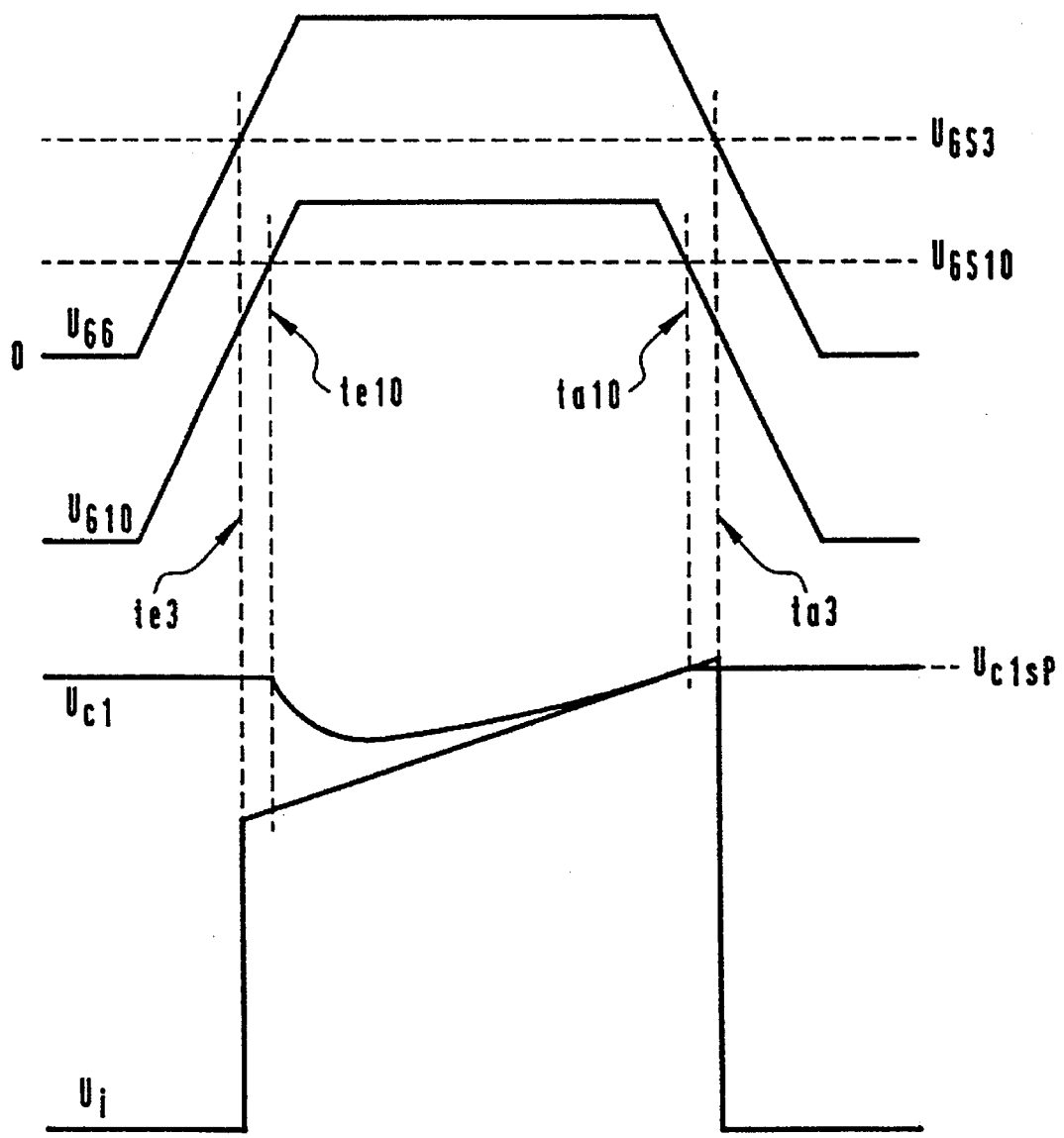

DC VOLTAGE CONVERTER WITH CURRENT LIMITATION

BACKGROUND OF THE INVENTION

The invention is directed to a DC voltage converter.

PCT/EP91/00724 discloses such a voltage converter. The known voltage converter is a matter of a clocked voltage converter with current limitation that contains a first electronic switch in the main circuit and a precision resistor in series therewith. A second electronic switch with the assistance of which the current-proportional test voltage is evaluated is located between the precision resistor and a capacitor having a discharge circuit. A control circuit that controls the first electronic switch for the purpose of a limitation of the pulse current flowing in the main circuit as soon as the capacitor voltage lies above a predetermined limit is connected to the capacitor. The second electronic switch, which is otherwise closed, is switched into the conductive condition during the turn-on phase of the first electronic switch. The second electronic switch is formed by the source-drain path of a field effect transistor. The source-drain path of the field effect transistor is directed such that the inverse diode of the field effect transistor is polarized in a conducting direction with reference to the voltage occurring at the precision resistor. The precision resistor is dimensioned such that the voltage dropping off thereat is lower than the threshold voltage of the inverse diode of the field effect transistor.

The second electronic switch should likewise be inhibited during the entire inhibited phase of the first electronic switch. It can likewise be conductive during the entire turn-on phase of the first electronic switch. Since the peak value of the current measuring voltage to be stored only arises at the end of the conductive phase of the first electronic switch, the second electronic switch can potentially be driven so that it is switched on only in a temporal sub-region of the turn-on phase of the electronic switch lying in the main circuit, and is switched conductive such that both electronic switches simultaneously switch from the conductive into the inhibited condition. Turn-on current spikes when connecting the capacitor can be reduced in this way, or voltage spikes that appear at the precision resistor at the beginning of the current pulses flowing in the main circuit can be suppressed.

EP-A1-0 404 996 already discloses a clocked voltage converter that, in addition to comprising an electronic switch lying in the main circuit, comprises a further electronic switch that is arranged between a precision resistor lying in the main circuit and a RC parallel circuit. This additional electronic switch is switched on and off, and is delayed with reference to the former electronic switch. The voltage at the capacitor follows the test voltage at the precision resistor. The capacitor is already discharged at the point in time of the delayed turn-off of the additional electronic switch.

A run-out of the characteristic at which the limiting effect is reduced or canceled is a problem in clocked voltage converters. This can ultimately lead to the destruction of component parts. The cause of such a behavior lies in the remaining minimum pulse width of the turn-on pulse that results due to a series of dead times in the controlled chain. When a LC element having an inductor in the longitudinal arm and a capacitor in the shunt arm is arranged in the output circuit and—caused by said minimum pulse width, when the positive voltage/time area applied to the output inductor upon turn-on is higher than the negative voltage/time area in the turn-off phase—then the magnetic energy rises, and thus the current rises in unlimited fashion from period to period.

The so-called run-out of the characteristic upon occurrence of a short-circuit that is problematical in voltage converters having relatively high output voltage can be avoided with the assistance of the initially cited, known circuit arrangement since the output voltage of the device for peak value rectification controls the control circuit for the purpose of limiting the pulse current flowing in the main circuit.

Investigations within the framework of the invention, however, have shown that different control properties of the two electronic switches can have a negative influence in the efficiency of the desired current limitation. Due to component tolerances, the case can occur under certain circumstances that the second electronic switch, which is intended to effect the peak value rectification of the pulse-shaped current measuring voltage, is still in the conductive condition at a point in time at which the first electronic switch inhibits and the current measuring voltage thus drops to the value of zero.

SUMMARY OF THE INVENTION

It is an object of the invention to design a voltage converter of the type initially cited such that the component tolerances do not have a disadvantageous influence on the quality of the peak value rectification of the ammeter voltage.

In order to achieve this object, the voltage converter of the invention has a first electronic switch with its control input connected to an output of a control circuit and which is switched on and off in alternating fashion by the control circuit. A precision resistor is arranged in series with the first electronic switch. A peak value rectification circuit is provided containing a second electronic switch arranged between a precision resistor and a capacitor. A discharge circuit is connected to the capacitor which can be respectively switched into the conductive condition during the turn-on phase of the first electronic switch. The first electronic switch is controlled by the control circuit dependent on an output voltage of the peak value rectification circuit for limiting pulse current flowing in a main circuit of the converter. A circuit for pulse processing is arranged between an output of the control circuit and control inputs of the first and second electronic switches. The circuit for pulse processing outputs pulses to the first and second electronic switches such that the second electronic switch is switched into an inhibited condition no later than simultaneously with the first electronic switch being switched into an inhibited condition. The second transistor is thereby shut off briefly before, or simultaneously with the first transistor.

The techniques of the invention advantageously yield a voltage converter having momentary current limitation wherein an effective current limitation in case of a shortcircuit is assured independently of scatter in the characteristics of the two electronic switches. In particular, different switching thresholds of the electronic switches cannot have a disadvantageous effect on the efficiency of the short-circuit current limitation.

The invention shall be set forth in greater detail with reference to the exemplary embodiments shown in FIGS. 1 and 2 as well as with reference to the pulse diagrams of FIGS. 3–6.

BRIEF DESCRIPTION OF THE DRAWINGS

FIG. 3 is a pulse diagram for a known voltage converter;

FIG. 4 is a pulse diagram for the voltage converter of FIG. 1;

FIG. 5 is an excerpt from the pulse diagram of FIG. 4;

FIG. 6 is a pulse diagram for the voltage converter of FIG. 2;

DESCRIPTION OF THE PREFERRED EMBODIMENTS

Figure 1:
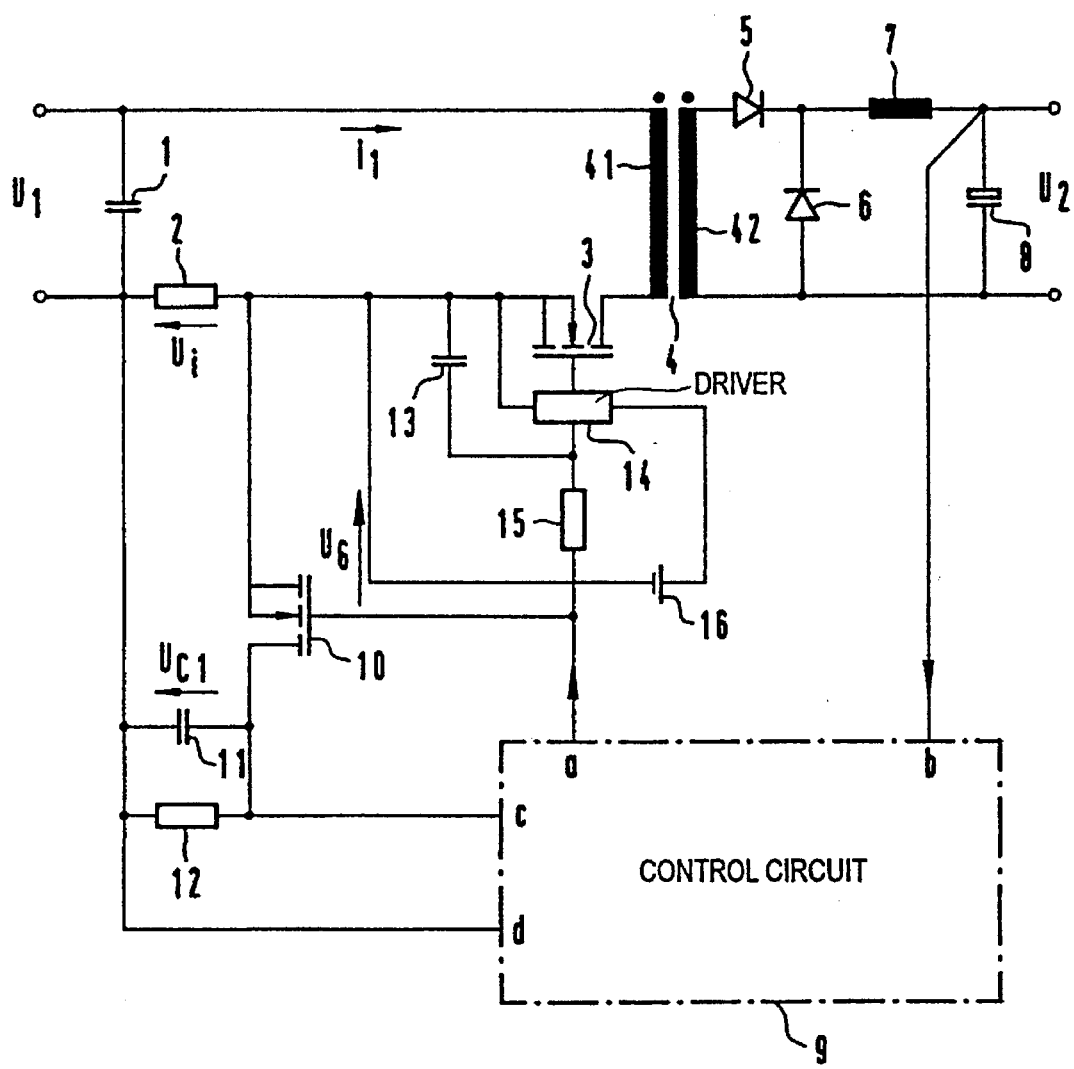
FIG. 1 is a clocked voltage converter having a device for peak value rectification and drive of the power switch via a delay element.

FIG. 1 shows a clocked voltage converter of the invention. Given the single-ended flow voltage converter shown in FIG. 1, the input voltage U1 is present at the capacitor 1 and the output voltage U2 is present at the capacitor 8. A series circuit formed of the primary winding 41 of the transformer 4, of the drain-source path of the field effect transistor 3 and of the precision resistor 2 lies parallel to the capacitor 1 in the main circuit at the primary side. The rectifier diode 5 lies between the secondary winding 42 of the transformer 4 and the capacitor 8. The freewheeling diode 6 is arranged in a shunt arm that follows the rectifier diode 5. The inductor 7 lies in a series arm between freewheeling diode 6 and capacitor 8.

An evaluation arrangement that is composed of the field effect transistor 10, the capacitor 11 and the resistor 12 is connected to the precision resistor 2. The series circuit composed of the capacitor 11 and the source-drain path thereby lies parallel to the position resistor 2. The resistor 12 lies parallel to the capacitor 11.

The resistor 12 forms a discharge circuit for the capacitor 11. The two field effect transistors 3 and 10, which serve as electronic switches, are N-channel MOS transistors. The source electrodes of the field effect transistors 3 and 10 are directly connected to one another. The gate of the field effect transistor 10 lies directly at the control output a of the control circuit 9.

A chain circuit composed of the RC element 13, 15 and the driver 14 lies between the output a of the control circuit 9 and the gate of the field effect transistor 3. The driver 14 has a reference potential terminal that belongs both to its input post pair as well as to its output post pair and is directly connected to the source of the field effect transistor 3. The input terminal of the driver 14 that carries voltage in comparison to the reference potential terminal is connected via the resistor 15 of the RC element 13, 15 to the control output a of the control circuit 9. The output terminal of the driver 14 that carries voltage relative to the reference potential terminal is directly connected to the gate of the field effect transistor 3.

The capacitor 13 of the RC element 13, 15 lies between the input terminal of the driver 14 which carries voltage compared to the reference potential terminal and the source of the field effect transistor 3. The auxiliary voltage source 16 lies between the supply voltage terminal of the driver 14 and the source of the field effect transistor 3. An integrated circuit of type TSC 427 can, for example, serve as driver.

The control means 9 serves the purpose of regulating the output voltage U2 to a constant value and has its actual value input b connected to the output of the voltage converter. In a predetermined dependency on the actual value voltage supplied to its input b, the control circuit 9 outputs turn-on pulses at its control output a to the gate terminals of the two field effect transistors 3 and 10 that respectively switched the two field effect transistors 3 and 10 conductive.

The control device 9 also has its control input c, d connected to the capacitor 11. The control device 9 evaluates the voltage present at the capacitor 11. When the capacitor voltage exceeds a predetermined value, a limitation of the current is flowing in the primary-side main circuit begins.

The transistor 10 is controlled by the control circuit 9 such that it is switched into the conductive condition during the turn-on phase of the transistor 3 and is otherwise inhibited. The capacitor 11 becomes low-impedance with the assistance of the field effect transistor 10, i.e. it is charged rapidly and exactly to the maximum value of a voltage occurring at the precision resistor 2. The comparatively slow inverse diode of the MOS field effect transistor 10 that is necessarily contained in the field effect transistor 10 and is not shown in the Figure is thereby practically without effect since its threshold voltage is not achieved in a conducting direction.

In the inhibit phase, the field effect transistor 10 becomes high-impedance very rapidly and prevents a reverse discharge of the capacitor 11. The capacitor 11 can be discharged via the resistor 12 with the desired time constant. Since the remaining resistance $R_{DSON}$ of the field effect transistor 10 is extremely small in comparison to the value of resistance of the discharge resistor 12, the voltage at the capacitor 12 corresponds very exactly to the maximum value of the measured current i1.

In the ideal case, the capacitor 11 should only be slowly discharged via the resistor 12 corresponding to the time constant τ=R17·C16 after the turn-off of the two transistors 3 and 10. This, however, assumes that the field effect transistor 3 inhibits time-vise simultaneously with the field effect transistor 10.

FIG. 3 shows a pulse diagram for illustrating this problem for a known, docked voltage converter having momentary value current limitation wherein the invention is not realized. The pulse diagrams in FIGS. 4–6 refer to the voltage converter of FIG. 2. Denoted in the pulse diagrams are:

| | |
|---|---|
| $U_G$ | control signal |
| $U_{G6}$ | control signal for the field effect transistor 6 |
| $U_{G10}$ | control signal for the field effect transistor 10 |
| $U_{GS3}$ | switching threshold of the main transistor |
| $U_{GS10}$ | switching threshold of the rectifier transistor |
| $U_i$ | measured value of the current |
| $U_{C1}$ | voltage at the storage capacitor |
| $\hat{U}_i$ | peak value of the measured current |
| $U_{C1SP}$ | measured value actually store |
| $\Delta t_a$ | time difference upon turn-off of the field effect transistors 3 and 10 |
| $t_e$ | turn-on duration |
| $t_{e3}$ | turn-on time of the field effect transistor |
| $t_{310}$ | turn-on time of the field effect transistor 10 |
| $t_a$ | turn-off duration |
| $t_{a3}$ | turn-off time of the field effect transistor 3 |
| $t_{a10}$ | turn-off time of the field effect transistor 10 |

The known voltage converter on which the pulse diagram of FIG. 3 is based derives in that—proceeding from the voltage converter of FIG. 1—the switch means 13 and 16 are omitted and the switch means 14 and 15 are replaced by a direct connection. The case is considered wherein—due to the technology or due to unit scatter, the first transistor 3 differs from the second transistor 10 in terms of its control properties to the effect that it has a higher switching threshold.

Since the switching edges of the control voltage $U_G$ coming from the output a of the control circuit have only a finite steepness, the transistor 3 is switched on later and switched off earlier than the transistor 10. What is especially critical for the peak value rectification is the difference between the turn-off times represented by the time span $\Delta t_a$, since the storage capacity 11 is still being greatly discharged during this time via the as yet conductive transistor 10 and the low-impedance resistor 2.

The level loss connected therewith leads to the undesired, premature re-activation of the transistor 3 in the rectification and, thus, to the run-out of the characteristic at short-circuit; this is precisely what is to be prevented with the short-circuit current limitation. When the discharge of the capacitor 11 is complete in the worst case, absolutely no storing of the measured value occurs.

The device contained in the clocked voltage converter of FIG. 1 for pulse processing, which contains the RC element 13, 15, by contrast, assures that the transistor 10 is inhibited shortly before the transistor 3 or simultaneously with the transistor 3. The pulse diagram of FIG. 4 and the excerpt from FIG. 4 shown in FIG. 5 show this result. Denoted in FIGS. 4 and 5 are:

| | |
|---|---|
| UG | output voltage of the controller 9 |
| U13 | delayed signal at the capacitor 13 |
| $U_{G3}$ | output voltage of the driver 14 = $U_{GS}$ of 3 |
| $U_{GS3}$ | gate/source voltage source of 3 |
| $U_{GS10}$ | gate/source voltage source of 10 |
| $t_{a3'}$ | turn-off time of 3 before the improvements |
| $t_{a10}$ | turn-off time of 10 |
| $t_{a3}$ | turn-off time of 3 after the improvement |
| $U_{S14}$ | switching threshold voltage of the drive 14. |

Whereas the voltage $U_G$ directly controls the charging transistor 10, the driver 14 is turned on and off with a lag via the delaying effect of the RC element 15, 13. The switching time allocation during the turn-on event is of practically no significance in the peak value rectification. The turn-off delay of the transistor 3 of $t_{a3}$, to $t_{a3}$, by contrast, assures that the transistor 10 is shut off before the transistor 3. The peak value thus remains stored.

What is achieved with the assistance of the delay circuit formed by the RC element 13, 15 is that the turn-on pulses supplied to the transistor 3 that switch the transistor 3 conductive are delayed, compared to the turn-on pulses that are supplied to the transistor 10.

The capacitance of the capacitor 13 and the value of resistance of the resistor 15 are dimensioned such that the time constant of the RC element 13, 15 is of approximately the same size as the maximum time difference $\Delta t_a$ of FIG. 3 resulting due to the component tolerances. Thus valid is:

$R_v \cdot C_v = \Delta t_a$.

What is achieved in this way is that the transistor 3 is switched into the inhibited condition no earlier than the same time as the field effect transistor 10. An undesirable discharge of the capacitor 11 is reliably avoided.

The drive 14 inserted between the gate of the transistor 3 and the delay element 13, 15 is particularly provided in addition to a driver that is contained in the control circuit 9 and is not shown in the FIG. The driver 14 prevents the retardation of the turn-on and turn-off events at the transistor 3 caused by the RC element from leading to an increase in the switching losses.

The driver 14 can be potentially replaced by a direct connection between resistor 15 and gate of the field effect transistor 3 when the increase of the switching losses connected with this measure can be accepted.

Figure 2:
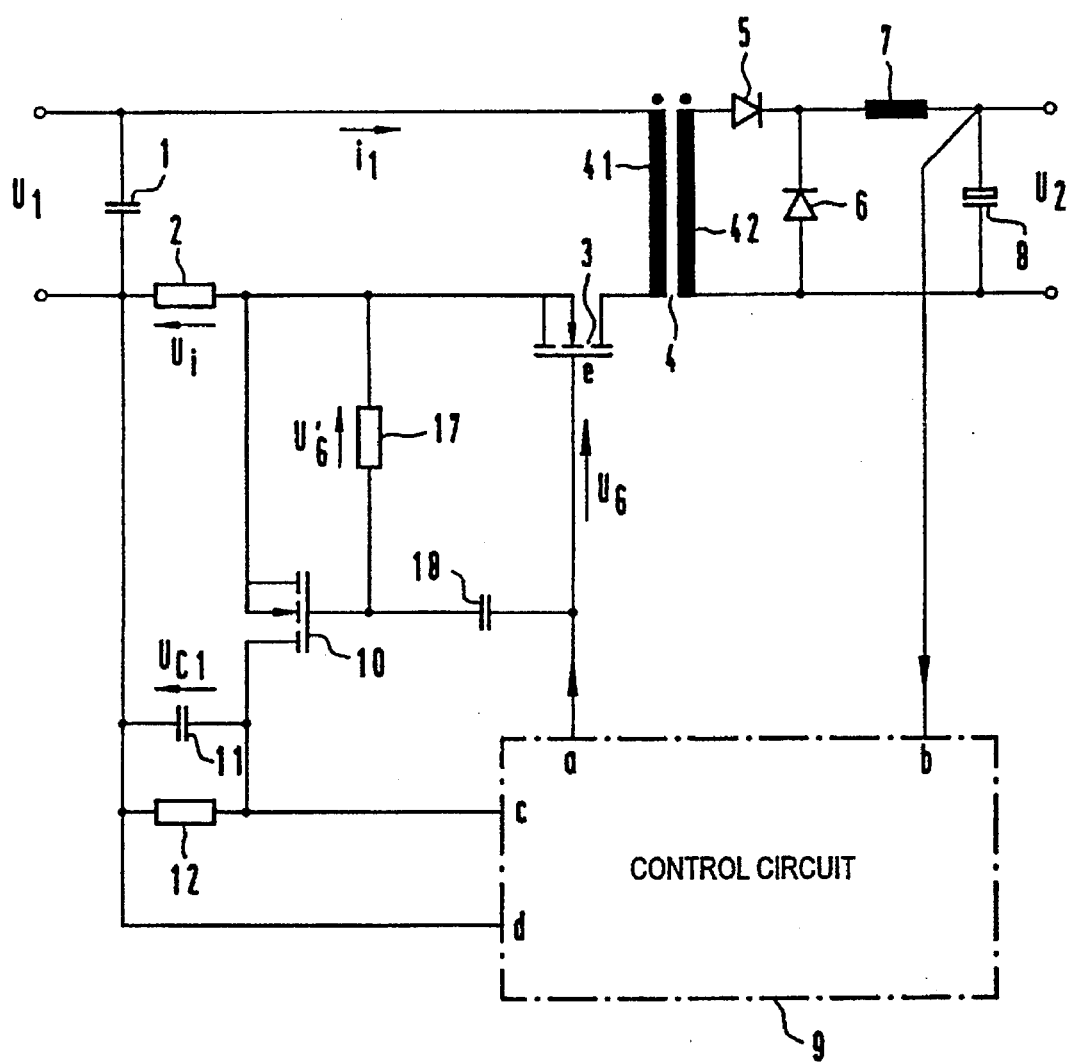
FIG. 2 is a clocked voltage converter having a device for peak value rectification that is driven via a differentiation element.

In the voltage converter of FIG. 2, the on-time inhibit of the field effect transistor 10 is achieved by a control level shift with the assistance of the differentiation element 17, 18.

The voltage converter of FIG. 2 largely coincides with that of FIG. 1. Differing therefrom, a differentiation element is provided instead of the RC element 13, 15 and the driver 14. This differentiation element is composed of the resistor 17 and the capacitor 18. The resistor 17 lies parallel to the gate-source path of the field effect transistor 10. The capacitor 18 lies between the control output a of the control circuit 9 and the gate of the field effect transistor 10. The gate of the field effect transistor 3 is directly connected to the control output a.

As the pulse diagram of FIG. 6 shows, the control voltage $U_{G10}$—due to the effect of the differentiation element 17, 18—shifts compared to the control signal $U_{G3}$ (which directly controls the transistor 3) in the direction toward lower values. As a result thereof, the field effect transistor 10 switches on later and switches off earlier than the field effect transistor 3. The result is the practically ideally stored peak value of the current measuring voltage in the capacitor 11. An unintended discharge cannot occur.

This measure is highly effective given comparatively little expense since relatively small voltage differences of approximately 1–2 V given an amplitude of approximately 10 V are involved in practice.

Figure 7:
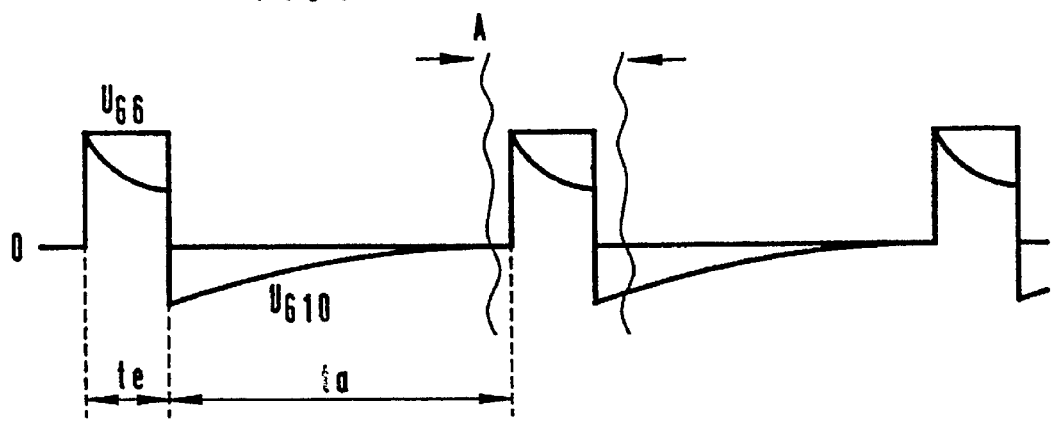
FIG. 7 is a further pulse diagram for the voltage converter of FIG. 2.
Figure 8:
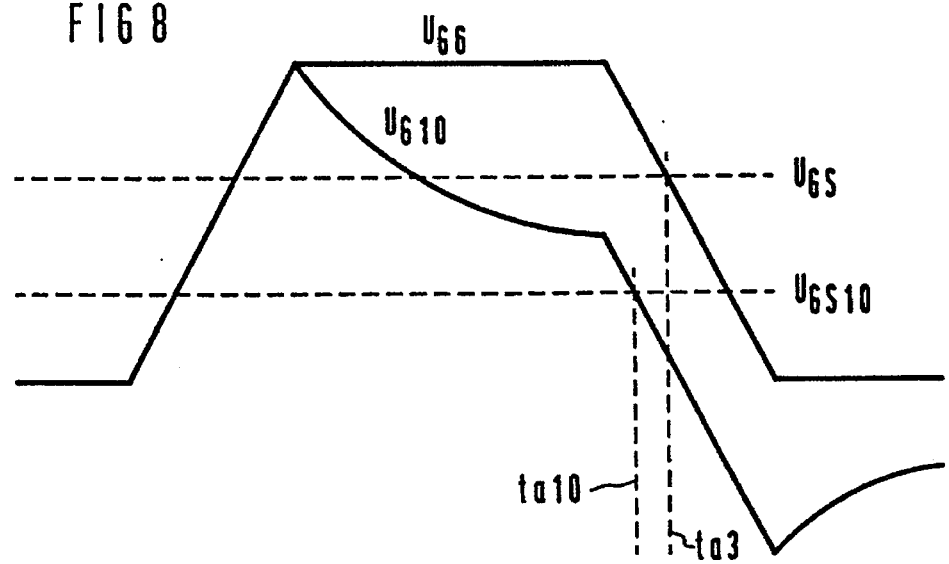
FIG. 8 is an excerpt from the pulse diagram of FIG. 7.

The time constant of the differentiation element $\tau = R_D \cdot C_D$ is especially selected such that it is far greater than the clocked frequency to be anticipated. When the time constant is selected such that it at least approximately corresponds to the on-time of the first field effect transistor 3, then arbitrary pulse-to-pause ratios can also be governed. FIGS. 7 and 8 show a pulse diagram for that case wherein the on-time is relatively short and the off-time is relatively long.

As electronic switches, the voltage converters of FIGS. 1 and 2 respectively contain a field effect transistor 3, 10. In a corresponding way, electronic switches of some other type, particularly bipolar transistors or what are referred to as IGBT (isolated gate bipolar transistor) can be potentially employed instead of the field effect transistor 3.

Figure 10:
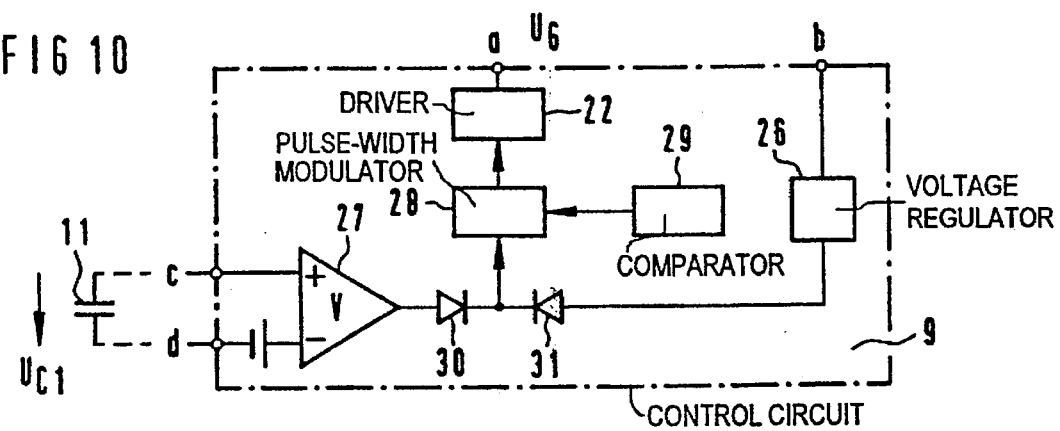
FIG. 10 is a control circuit having a pulse-width modulator that can be controlled in the sense of a separation regulator.
Figure 11:
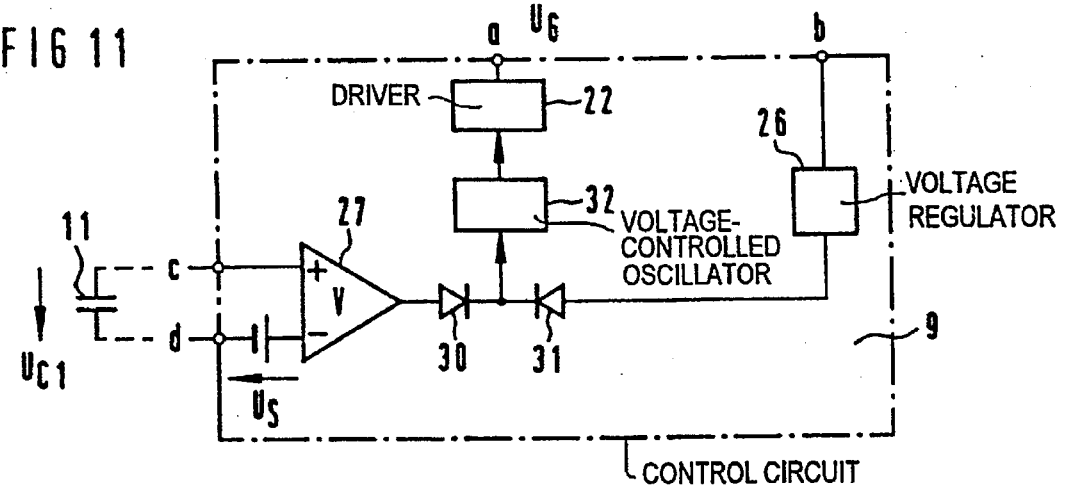
FIG. 11 is a control circuit having an oscillator that can be controlled in the sense of a separation regulator.

In the voltage converters of FIGS. 1 and 2, the control means 9—which has its actual value input b connected to the output of the voltage converter and that outputs turn-on pulses at its control output a that respectively switch the two electronic switches of the voltage converter conductive-respectively serves the purpose of regulating the output voltage U2. Preferred embodiments of the control circuit 9 are shown in FIGS. 9–11.

Figure 9:
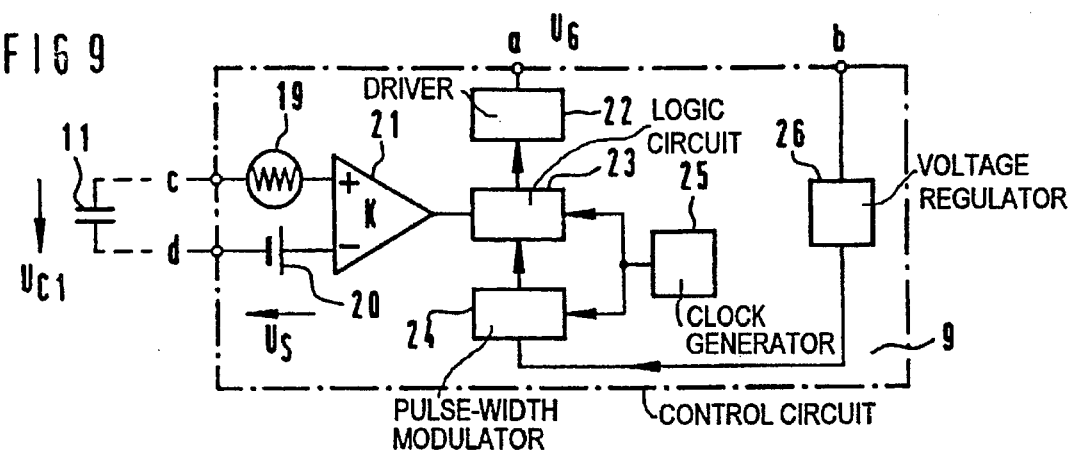
FIG. 9 is a control circuit having a pulse-width modulator that can be controlled with a comparator.

The control circuit of FIG. 9 contains the voltage regulator 26, the pulse-width modulator 24, the logic circuit 23 and the driver 22.

In the control circuit 9 of FIG. 9, the logic circuit 23 and the pulse-width modulator 24 are controlled in common by the clock generator 25. The logic circuit 23 also has an inhibit input connected to the output of the comparator 29 that compares the rated voltage $U_S$ of the rated voltage generator 20 to an aggregate voltage that is composed of the voltage $U_{C1}$ at the capacitor 11 and of the delta voltage of the delta voltage generator 19. The delta voltage generator 19 can be potentially located in the rated value branch instead of in the actual value branch, and can be replaced by a short-circuit given a corresponding selection of the operating range.

The output voltage $U_G$ of the driver 22 is composed of turn-on pulses that are supplied to the gate-source paths of the field effect transistors 3 and 10. The voltage $U_i$ drops off at the precision resistor 3 and corresponds to the current i1 flowing in the main circuit of the voltage converter. The voltage $U_{C1}$ derives at the capacitor 11. The output voltage $U_{KA}$ of the comparator 21 is a sequence of square-wave pulses. The rising edge represents the beginning of an inhibit signal and the trailing edge represents the beginning of a release or enable signal. The brief-duration discharge of the capacitor 11 at the beginning of the pulse caused by the slanting rise of the current i1 is of practically no significance since the peak value of the current i1 only occurs at the end of the conductive phase and remains stored after the turn-off.

The voltage at the capacitor 11 is evaluated with the assistance of the comparator 21. The delta voltage source 19 supplies an external, synchronous delta signal that is superimposed on the voltage $U_{C1}$. Acquired, on the one hand, as a result of this superimposition of a synchronous delta signal is a defined switching criterion and, secondly, the stability in the sub-harmonic range is increased.

The number of pulses omitted in the short-circuit case is dependent on the minimum pulse width and on the on-state voltage of the freewheeling diode 6 of FIGS. 1 or 2.

In the control circuit of FIG. 10, the operational amplifier 27 is provided instead of the comparator 21 in FIG. 7. The output of the operational amplifier 27 and the output of the voltage regulator 26 are conducted to the input of the pulse-width modulator 28 via a respective diode 30 or 31, so that what is referred to as a separation regulator results. The driver 22 is directly connected to the pulse-width modulator 28.

In this embodiment, the amplified repetitive error or deviation controls the pulse-width modulator 28 and sets the operating point. In the short-circuit case, the repetitive error or deviation amplified by the operational amplifier 27 can inhibit the pulse-width modulator 28 for a number of periods as needed and can thereby fully maintain the limiting effect.

The embodiment of the control circuit 9 shown in FIG. 9 is especially advantageous given high-frequency voltage changers. In case of overload, the operational amplifier 27 amplifies the repetitive error or deviation $U_S$—$U_{C1}$ and drives the voltage-controlled oscillator 32 toward lower frequencies. The turn-on duration of the current pulse in fact remains constant. Due to steady frequency reduction, however, the desired equilibrium condition is also achieved given a short-circuit of the output posts of the voltage converter.

The voltage converters having a control circuit 9 of FIGS. 9, 10 or 11 that are shown in FIGS. 1 and 2 can be utilized in a very broad frequency range since the field effect transistor can be a small MOS transistor having switching times of approximately 5–20 ns and can have extremely small parasitic capacitances, for example approximately 5 pF. The switching frequency can thereby amount to approximately 1–2 MHz.

The voltage converter can be designed as a flow voltage converter or as a blocking voltage converter having constant clock frequency or as a voltage converter having frequency modulation.

A current regulation having superimposed voltage regulation (current-mode voltage regulation) wherein the output signal of a voltage regulator serves as a rated value of the current is possible without further ado with the assistance of the measured signal at the current measuring resistor 3 since the signal at the low-impedance precision resistor 3 is not falsified in practice, even in the time spans critical for the regulation.

Although the invention has been described with respect to preferred embodiments, it is not to be so limited as changes and modifications can be made which are within the full intended scope of the invention as defined by the appended claims.

I claim as my invention:

1. A clocked voltage converter with current limitation, comprising:

a transformer having a primary side at which a main circuit is provided having a voltage input and a secondary side at which an output circuit is provided having a voltage output;

a first electronic switch in series with a precision resistor connected between the input voltage and the primary side of the transformer;

a peak value rectification circuit comprising a second electronic switch connected between the precision resistor and a capacitor;

a discharge circuit connected to discharge said capacitor;

a control circuit having first pulses at an output thereof which are fed to a control input of said second electronic switch and also to an input of a pulse processing circuit, said pulse processing circuit creating second pulses which are different than said first pulses and which are fed to a control input of said first electronic switch;

said control circuit also having an input connected to said voltage output, and another control input connected to said capacitor, and said control circuit providing said first pulses at said output so that said first electronic switch is controlled dependent on an output voltage of said peak value rectification circuit and an output voltage at said voltage output for limiting pulse current flowing in said main circuit; and said pulse processing circuit producing said second pulses which are different than said first pulses so that the second electronic switch switches into an inhibited condition no later than simultaneously with switching of said first electronic switch into an inhibited condition.

2. A voltage converter according to claim 1 wherein said control input of said second electronic switch is connected directly to said output of said control circuit, and said pulse processing circuit has a delay circuit arranged between said output of said control circuit and said control input of said first electronic switch.

3. A voltage converter according to claim 2 wherein said delay circuit is formed by an RC circuit having a resistor lying between said output of said control circuit and said control input of said first electronic switch and having a capacitor connected parallel to said control input of said first electronic switch.

4. A voltage converter according to claim 3 wherein a time constant of said RC circuit is dimensioned such that said second electronic switch is switched into said inhibited condition at a point in time earlier than when said first electronic switch is switched into said inhibited condition.

5. A voltage converter according to claim 1 wherein said pulse processing circuit comprises an RC circuit having a resistor connected between said output of said control circuit through a driver to said control input of said first electronic switch, and a capacitor connected between a junction between the driver and the resistor and a junction between said precision resistor and said first electronic switch.

6. A voltage converter according to claim 1 wherein said first and second electronic switches are field effect transistors of a same conductivity type, source terminals of the two field effect transistors connecting to one end of said precision resistor, and gate electrodes of the two field effect transistors being connected to said pulse processing circuit.

7. A clocked voltage converter with current limitation, comprising:

a transformer having a primary side at which a main circuit is provided having a voltage input and a secondary side at which an output circuit is provided having a voltage output;

a first electronic switch in series with a precision resistor connected between the input voltage and the primary side of the transformer;

a peak value rectification circuit comprising a second electronic switch connected between the precision resistor and a capacitor;

a discharge circuit connected to discharge said capacitor;

a control circuit having first pulses at an output thereof which are fed to a control input of said first electronic switch and also to an input of a pulse processing circuit, said pulse processing circuit creating second pulses which are different than said first pulses and which are fed to a control input of said second electronic switch;

said control circuit also having an input connected to said voltage output, and another control input connected to said capacitor, and said control circuit providing said first pulses at said output so that said first electronic switch is controlled dependent on an output voltage of said peak value rectification circuit and an output voltage at said voltage output for limiting pulse current flowing in said main circuit; and said pulse processing circuit producing said second pulses which are different than said first pulses so that the second electronic switch switches into an inhibited condition no later than simultaneously with switching of said first electronic switch into an inhibited condition.

8. A voltage converter according to claim 7 wherein said pulse processing circuit comprises a differentiating circuit connected between said output of said control circuit and said control input of said second electronic switch.

9. A voltage converter according to claim 8 wherein a time constant of said differentiating circuit is dimensioned so that it is substantially greater than a maximally anticipated pulse repetition rate with which turn-on pulses fed to said differentiating circuit from said control circuit follow one another.

10. A voltage converter according to claim 7 wherein the first and second electronic switches are field effect transistors of a same conductivity type, source terminals of the two field effect transistors connecting to one end of said precision resistor, and gate electrodes of the two field effect transistors being connected to said pulse processing circuit.

11. A voltage converter according to claim 7 wherein said control input of said first electronic switch is connected directly to said output of said control circuit.

* * * * *